(12) United States Patent
Perroux et al.

(10) Patent No.: US 6,459,441 B1
(45) Date of Patent: Oct. 1, 2002

(54) SOFTWARE INTERFACE

(75) Inventors: Francois Perroux, Sevres (FR); Duy Minh Vu, Puteaux (FR)

(73) Assignee: Dassault Systemes, Suresnes Cedex (FR)

( * ) Notice: Subject to any disclaimer, the term of this patent is extended or adjusted under 35 U.S.C. 154(b) by 0 days.

(21) Appl. No.: 09/261,657

(22) Filed: Mar. 3, 1999

(51) Int. Cl.⁷ .................................................. G06F 3/00
(52) U.S. Cl. ....................... 345/837; 345/835; 345/765; 345/328
(58) Field of Search ................................. 345/345, 440, 345/347, 837, 835, 765, 328, 804, 805, 839

(56) References Cited

U.S. PATENT DOCUMENTS 5,689,286 A * 11/1997 Wugoski ..................... 345/348
5,973,693 A * 10/1999 Light .......................... 345/440
6,067,086 A *  5/2000 Walsh ......................... 345/347

* cited by examiner

Primary Examiner—Kristine Kincaid
Assistant Examiner—Mylinh T Tran
(74) Attorney, Agent, or Firm—James V. Mahon; Clifford Chance Rogers & Wells LLP

(57) ABSTRACT

A software control method includes forming groups of software application functions. A different characteristic is associated with each of the groups, and a different graphical user interface (GUI) object is formed for each function in each of the groups. Each GUI object includes the characteristic associated with its function's group and a second characteristic that distinguishes its function from other functions within its function's group. A computer program residing on a computer-readable medium includes instructions for causing a computer to form a different graphical user interface (GUI) object for each of a collection of software functions. Each GUI object may include a first visual characteristic that identifies a first characteristic of the object's associated function, and a second visual characteristic that identifies a second characteristic of the object's associated function.

18 Claims, 6 Drawing Sheets

SOFTWARE INTERFACE

BACKGROUND

Computer systems can have a graphical user interface (GUI) through which operating system and application software functionality is accessed. A GUI can represent computer application programs, documents, and data files as graphically displayed GUI objects, such as icons and menus. GUI objects can be manipulated by a user to control and activate system and application functions. A user may manipulate GUI objects by means of a pointing device such as a mouse. A mouse is an input device which, when moved over a surface, moves a display screen pointer in a corresponding direction. A mouse typically has a number of buttons which can be pressed ("clicked") to select a GUI object being pointed at by the pointer, and to activate the GUI object's associated function. GUI operating systems and applications may also be referred to as "point-and-click" systems. The Microsoft Windows 98® and the Apple Macintosh MacOS® operating systems are examples of common GUI-based computer operating systems that support GUI-based applications.

A well-designed GUI interface can facilitate a user's understanding of a software application. Some GUI objects, such as icons, can include a picture or other characteristic that is intended to suggest the function associated with the GUI object. Such function-suggesting GUI objects can assist a user in operating a software application. For example, to remind a user how to access printing functionality, an application can use an icon bearing a picture of a printer (a "printer icon").

If a group of applications use GUI objects with similar visual characteristics to represent similar functions, then a user's understanding of one application can help the user understand other applications in the group. For example, once a user has learned that a printer icon activates a print function in a one application, the user may intuitively understand that when the same printer icon appears in another application, it will activate a similar printing function. Similarly, when GUI objects have dissimilar characteristics, it suggests that the functions associated with such objects will have dissimilar characteristics. The use of dissimilar GUI objects may thereby reinforce a user's understanding of different functions within an application.

A software application designer may want to use dissimilar GUI objects for dissimilar functions and similar GUI objects for similar functions. Such an objective can be difficult to meet when a group of functions have characteristics that are similar, suggesting that similar GUI objects should be used, and other characteristics that are dissimilar, suggesting that dissimilar GUI objects should be used. For example, a word processing application may support two different print operation. The first print operation may print document text and the second print operation may print document statistical information, such as the number of words in the document and the last time the document was changed. From one perspective, these operations are similar in that each operation is a print operation. From another perspective, these operations are dissimilar in that the information printed is different. An application designer can use similar icons for these functions to suggest that each icon is associated with a printing function. However, if similar icons are used, a user may be confused as to whether a particular icon causes document text or document statistical information to be printed. Alternatively, the application designer can use dissimilar icons. However, the use of dissimilar icons may reduce the icon's ability to suggest their associated function. Consequently, an improved way of expressing application functionality through the use of GUI objects is desired.

SUMMARY

GUI objects that can simultaneously express multiple characteristics can be used in GUI interfaces. Multiple characteristic GUI objects can simultaneously suggest both similar and dissimilar associations to a user, thereby enabling an application designer to indicate functions that are similar, while simultaneously highlighting differences.

In general, in one aspect, the invention features a software control method. The method includes forming a plurality of groups each including one or more functions of a software application. A different characteristic is associated with each of the groups, and a different graphical user interface (GUI) object is formed for each function in each of the groups. Each GUI object includes the characteristic associated with its function's group and a second characteristic that distinguishes its function from other functions within its function's group.

In general, in another aspect, the invention features a computer program residing on a computer-readable medium. The program includes instructions for causing a computer to form a different graphical user interface (GUI) object for each of a collection of software functions. Each GUI object may include a first visual characteristic that identifies a first characteristic of the object's associated function, and a second visual characteristic that identifies a second characteristic of the object's associated function.

In general, in another aspect, the invention features a computer system having a graphical user interface (GUI). The GUI includes different graphical user interface (GUI) objects each user-selectable to access functionality associated with a software application. Each GUI object has a first visual characteristic that identifies a first characteristic of the object's associated function, and a second visual characteristic that identifies a second characteristic of the object's associated function.

Implementations may include one or more of the following features. GUI objects may have some characteristics in common and other characteristics that distinguishes the GUI objects from each other. GUI object characteristics may include background images, foreground images, and colors. Software application functions may having some characteristics in common and others that differ. Such functions may be associated with GUI objects that have corresponding characteristics in common and corresponding others that differ. A user selection may be received to identify a GUI object and to execute a function associated with the selected GUI object.

The details of one or more embodiments of the invention are set forth in the accompanying drawings and the description below. Implementations may provide advantages such as facilitating access to localized data without requiring user location input. Other features, objects, and advantages of the invention will be apparent from the description and drawings, and from the claims.

DETAILED DESCRIPTION

Figure 1:
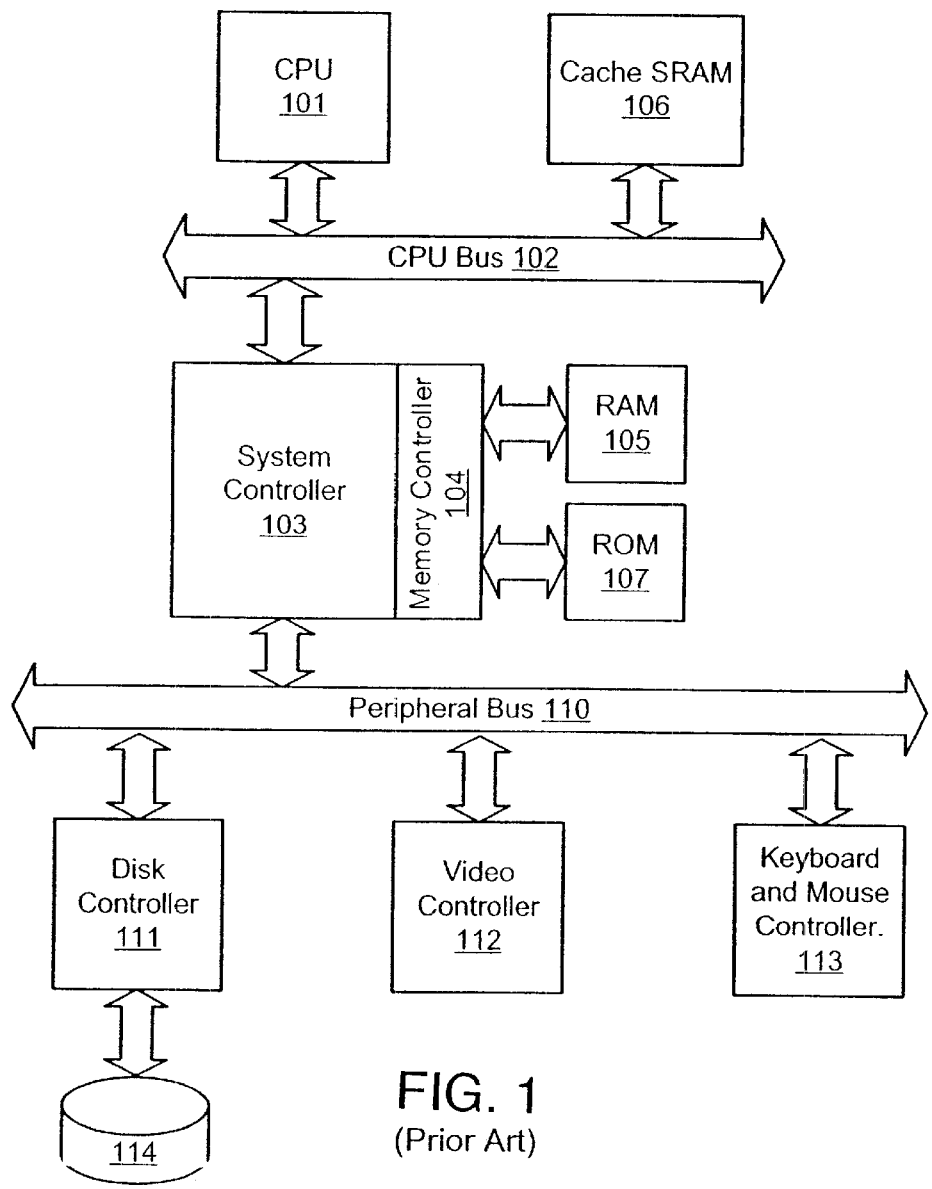
FIG. 1 is a block diagram of a computer system.

FIG. 1 depicts physical resources of a computer system 100. The computer 100 has a central processor 101 connected to a processor host bus 102 over which it provides data, address and control signals. The processors 101 may be any conventional general purpose single- or multi-chip microprocessor such as a Pentium® processor, a Pentium® Pro processor, a Pentium II® processor, a MIPS® processor, a Power PC® processor or an ALPHA® processor. In addition, the processor 101 may be any conventional special purpose microprocessor such as. a digital signal processor or a graphics processor. The microprocessor 101 has conventional address, data, and control lines coupling it to a processor host bus 102.

The computer 100 includes a system controller 103 having an integrated RAM memory controller 104. The system controller 103 is connected to the host bus 102 and provides an interface to random access memory 105 and read only memory 107. The system controller 103 also provides host bus to peripheral bus bridging functions. The controller 103 thereby permits signals on the processor host bus 102 to be compatibly exchanged with signals on a peripheral bus 110. The peripheral bus 110 may be, for example, a Peripheral Component Interconnect (PCI) bus, an Industry Standard Architecture (ISA) bus, or a Micro-Channel bus.

Accessory devices including, for example, a hard disk drive control interface 111 coupled to a hard disk drive 114, a video display controller 112 and keyboard and mouse controller 114 can be coupled to the peripheral bus 110 and controlled by the processor 101.

ROM memory 107 may store system 100 configuration information and basic computer software routines that allow an operating system to be "booted" from the disk 114. The operating system is, for example, the Microsoft Disk Operating System (DOS)™, Windows 95™, Windows NT™, a UNIX operating system, the Apple MacOS™ operating system, or other operating system.

An operating system may be fully loaded in the RAM memory 105 or may include portions in RAM memory 105, ROM memory 107 and in disk drive storage 114. For example, the Microsoft Windows 95™ operating system includes some functionality that remains in memory 105 during the use of Windows 95™ and other functionality that can be periodically loaded into RAM memory 105 on an as-needed basis from disk 114. An operating system, such as Windows 95™ or Windows NT™ provides functionality to execute software applications. A software applications and/ or operating system can access the display controller 112 and other resources of the computer system 100 to provide a graphical user interface (GUI).

Figure 2:
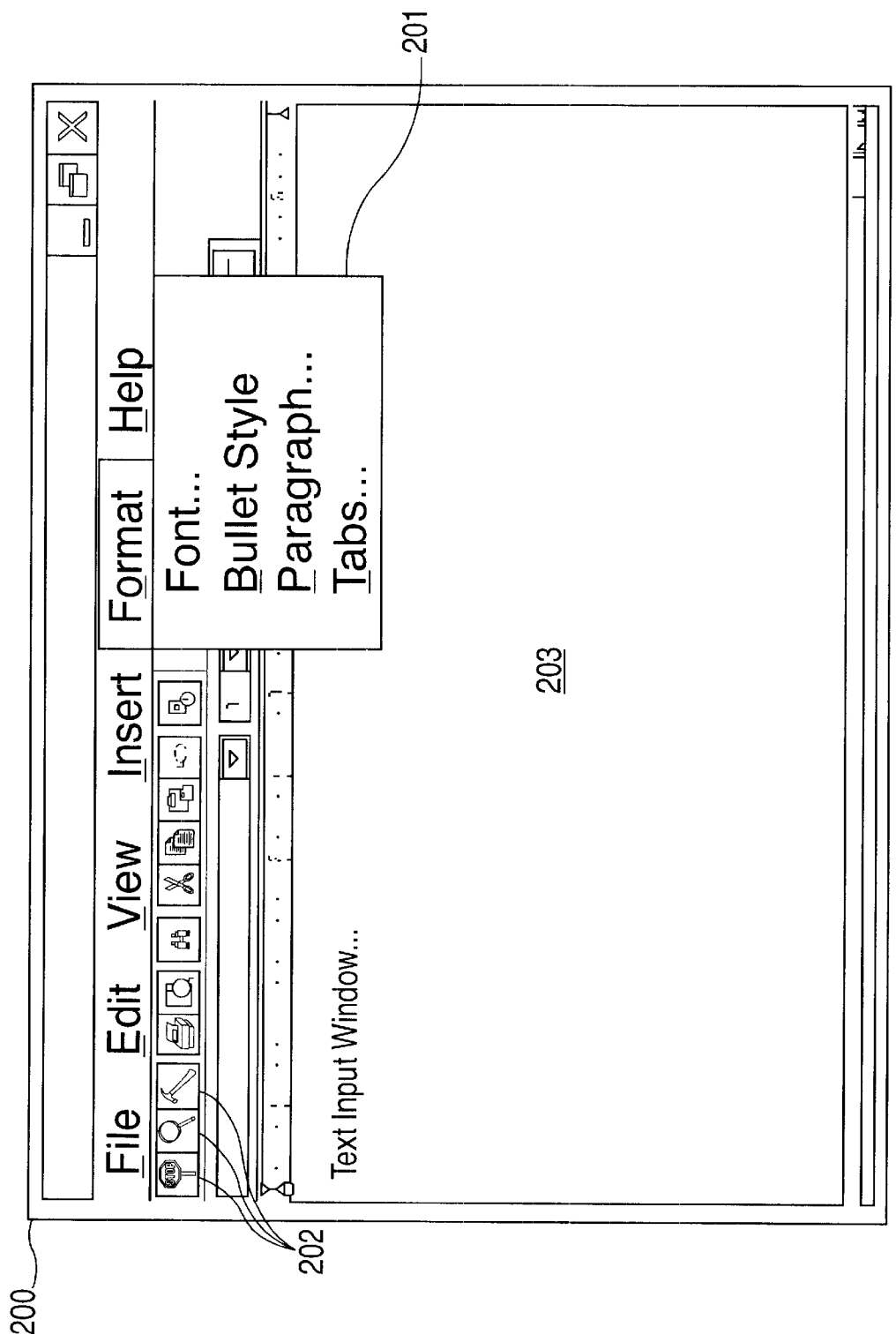
FIG. 2 is an exemplary graphical user. interface application display.

FIG. 2 shows a visual image 200 that can be produced by a GUI-based software application by accessing operating system functionality to send control commands to the display controller 112. A GUI-based application can include one or more interrelated programs providing numerous user accessible and controllable functions. Each function may be controlled by one or more GUI objects, including GUI objects such as&a menu 201, icons 202, text input window 203, and other GUI interface elements. To create an intuitive user interface, each GUI object should have a characteristic that is well-known or otherwise suggests the function associated with the GUI object. At the same time, each GUI object should have a distinct characteristic so as to prevent confusion regarding the object's associated function.

A GUI interface can be design using GUI objects that having multiple characteristics, and in which each characteristic of an object can suggest a different associated property. Multiple-characteristic GUI objects can be advantageous where, for example, an application has one or more similar functions, thus suggesting the use of similar GUI objects, while at the same time requiring that each GUI object be distinct to prevent user confusion.

In an exemplary implementation, multiple-characteristic GUI objects can be used to express both an operational domain (i.e., a functional category) associated with an icon, and a particular functions within the icon's operational domain. This use of multiple-characteristic GUI objects is further illustrated by reference to a computer aided design and manufacturing (CAD/CAM) application. A CAD/CAM application can include a number of operational domains, each of which includes interrelated functions that are used together to accomplish a particular CAD/CAM task. For example, a CAD/CAM application can have three different operational domains; a first providing part assembly functions, a second providing part design functions, and a third providing stress analysis functions. The part assembly domain may include functions to assemble pre-designed parts into a finished product, the part design domain may include functions to design the available parts from a library of available tools and materials, and the stress analysis domain may include functions to perform stress analysis calculations on finished products or on designed parts. Each domain may be implemented as a separate application program able to exchange data with other domain programs. Alternatively, each domain may be a separate module or library within an application program. Still other implementation variations may be used.

Figure 3:
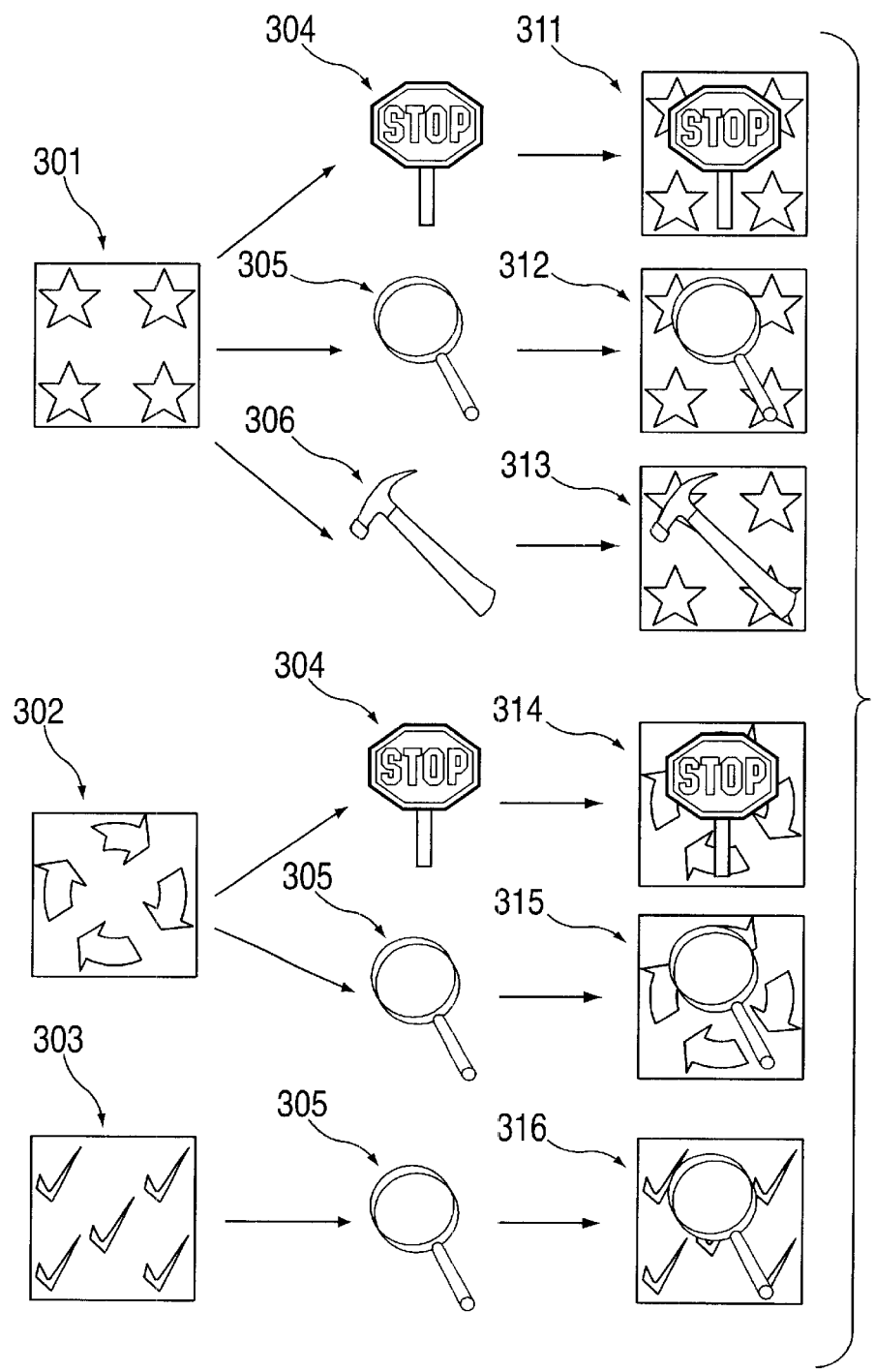
FIG. 3 depicts multiple-characteristic GUI interface objects.

The functions within each CAD/CAM operational domain can be accessed by icons that use multiple characteristics to express both an associated domain and an associated function within the domain. As shown in FIG. 3, multiple characteristic icons 311–316 can be formed by combining background images 301–303 with foreground images 304–306. Each background image 301–303 may be associated with a particular CAD/CAM domain. For example, background image 301 may be associated with the part assembly domain, image 302 may be associated with the part design domain, and image 303 may be associated with the stress analysis domain. Thus, each image 301–303 can be used to express a functional domain characteristic. Foreground image 304–306 may be used to provide a domain-independent suggestion of a particular tasks or operation to be performed. For example, the top sign image 304 may be associated with a cancel operation, the magnifying glass image 305 may be associated an operation to displaying information, and the hammer image 306 may be associated with an assembly operation. Thus, icon images 304–306 can be used to express characteristics related to a particular function regardless of the function's domain. The combination of background images 301–303 with foreground images 304–306 results in icons 311–316 that suggest the CAD/CAM operations shown in Table 1.

TABLE 1

Exemplary Multiple-Characteristic Icons

| ICON | SUGGESTED OPERATION |
|---|---|
| 311 | Cancel a part assembly operation. |
| 312 | Display part assembly information. |

TABLE 1-continued

Exemplary Multiple-Characteristic Icons

| ICON | SUGGESTED OPERATION |
|---|---|
| 313 | Perform part assembly operation. |
| 314 | Cancel a part design operation. |
| 315 | Display part design information. |
| 316 | Display stress analysis information. |

As described in Table 1 and as shown in FIG. 3, similar characteristics can be used for multiple GUI object while maintaining GUI object distinctiveness. For example, the magnifying glass image 305 is a characteristic that is associated with three icons 312, 315, and 316 indicating that each icon 312, 315, and 316 is used to display information. Even through the icons 312, 315 and 316 have a similar characteristic 305, each icon 312, 315, 316 remains distinct through the use of a differing second characteristic 301–303, respectively.

Figure 4A:
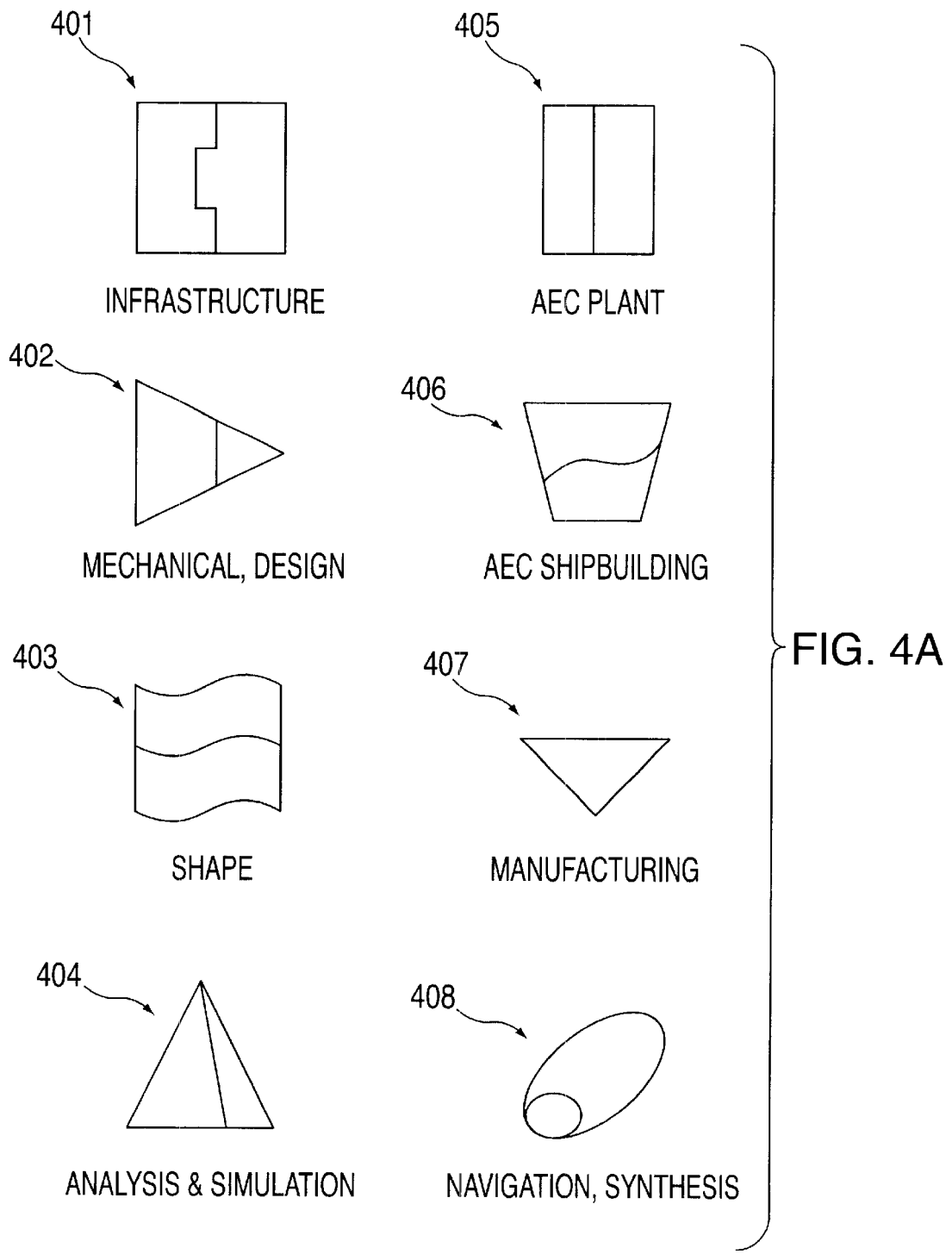
FIGS. 4A–4D show exemplary images for use in a CAD/CAM/CAE environment.
Figure 4B:
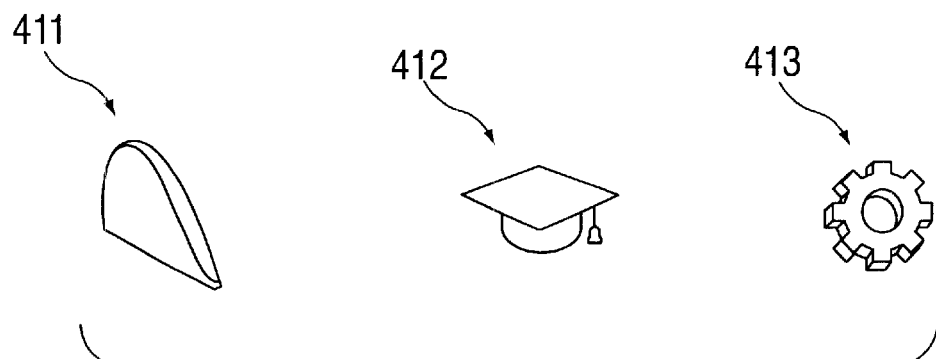
Figure 4C:
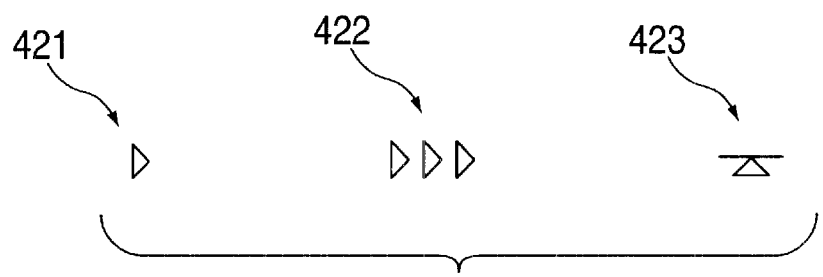
Figure 4D:
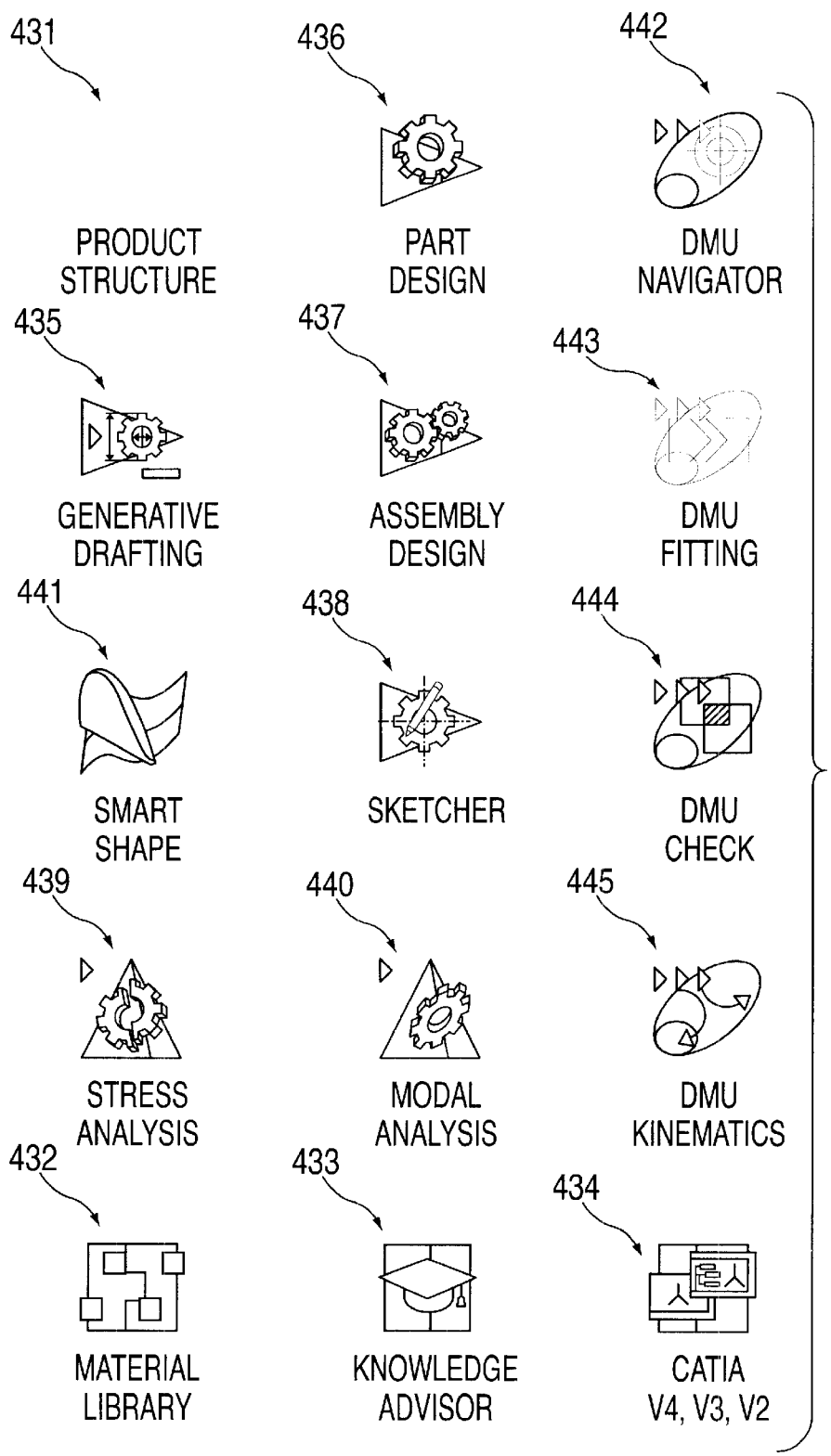

FIGS. 4A–4D show exemplary images that can be combined to form multi-characteristic icons for use in a computer aided drawing/computer aided manufacturing/computer aided engineering (CAD/CAM/CAE) environment. FIG. 4A shows background images 401–408. Each of the images 401–408 is associated with a group of interrelate CAD/CAM/CAE functions. For example, image 404 may be associated with analysis and simulation functions while image 402 is associated with mechanical design. FIGS. 4B and 4C show foreground images that can be combined with the background images of FIG. 4A. Image 411 may be associated with the design of a shape, image 412 with a knowledge or advising function, and image 413 with the design of individual parts. Images 421–423 may be qualifiers that can be further added to combinations of the images of FIG. 4A with the images of FIG. 4B. Qualifier images 421–423 may be associated with generative, dynamic, and optimization functions of a CAD/CAM/CAE application, respectively. The icon images of FIGS. 4A–4C can combined to express a descriptive icon language. FIG. 4D shows icons 431–445 formed by combination of images include the images of FIGS. 4A–4C. For example, icons 436–440 each include a background mechanical design image 402 indicating that each of the icons 436–440 is associated with a mechanical design operation.

Information gained from an icon's background image 401–408 is further refined by combinations of foreground images, such as the images 411–413 and 421–423. For example, icon 436's use of the part design image 413 along with the mechanical design background image 402 indicates that icon 436 is associated with the mechanical design of a part. Even further refinement can be obtained by the use of a second foreground image on an icon. For example, icons 439–440 each include an analysis and simulation background image 404, a foreground image, and a generative qualifier image 421. The presence of the generative qualifier image indicates that each of the icons 439–440 is associated with a generative function.

Multiple-characteristic GUI objects can also be formed by using characteristics in addition to, or instead of, pictorial images. For example, a red, a green, and a blue colored background may be substituted in place of the background images 101–103 to produce distinct multiple-characteristic icons having foreground images 104–106 over a red, green, or blue background. In a menu-based implementation, different background colors can be associated with different operational domains, and text labels can be used to identify particular functions within an operational domain. Multi-characteristic GUI object images may be formed manually, such as by combining images using an icon image editor, or may be formed using an automated program to overlay various icon images to form a composite image.

Multiple-characteristic icons can be used within applications; among multiple applications in a suite of applications, and for icon images on a operating-system provided "desktop." For example, multiple-characteristic icons can be used to represent particular groupings of applications accessible by program applications on a Windows 95 "desktop."

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on; a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, in some GUI implementations, different shapes may be associated with GUI objects and used to express different characteristics associated with the GUI objects. In other implementations, GUI objects can express more than two characteristics. Accordingly, other embodiments are within the scope of the following claims.

What is claimed is:

1. A software control method comprising:

Operationally associating a different graphical user interface (GUI) object with each of a plurality of functions of a software application, the plurality of functions being subdivided into a plurality of groups including a first group and a second group, each comprising at least two of the functions, and each one of the GUI objects comprising a first characteristic associating said one of the GUI objects with a one of the plurality of groups comprising the function associated with said one of the GUI objects, said first characteristic being common to each of the GUI objects in a same one of the plurality of groups, and, for each GUI object in the same one of the groups, a second characteristic that is different for each of the functions in the second group to distinguish the function associated with said one of the GUI objects from functions associated with other GUI objects in the same one of the groups, and each of the first and second characteristics of each GUI object being distinguishable by a user upon presentation of each GUI object; presenting ones of the GUI objects to a user as an interface enabling control of the software application; and wherein the first and second characteristics are non-spatial characteristics, functions in the first group have a first operationally related purpose, and functions in the second group have a second operationally related purpose different from said first related purpose.

2. The method of claim 1 wherein the software application comprises an application to process a model of a three dimensional object comprised of a plurality of parts, a first one of the groups comprises functionality associated with design of ones of the parts, a second one of the groups comprises functionality associated with assembling together said parts to construct the model.

3. The method of claim 2 further comprising displaying a first GUI object associated with a function in the first group and displaying a second GUI object associated with a function in the second group, where the first and second GUI objects comprise the same second characteristic.

4. The method of claim 1 wherein each of the first characteristics comprises an icon background image and each of the second characteristics comprises a foreground image.

5. The method of claim 1 further comprising receiving a user selection of the first GUI object and performing the function associated with the first GUI object.

6. The method of claim 1 wherein said first characteristic comprise a color characteristic.

7. The method of claim 6 wherein each GUI object is an icon.

8. An application control method comprising:

Operationally associating a different graphical user interface (GUI) object with each of a plurality of functions of a software application, the plurality of functions being subdivided into a plurality of groups including a first group and a second group, each comprising at least two of the functions, and each one of the GUI objects comprising a first characteristic associating said one of the GUI objects with a one of the plurality of groups comprising the function associated with said one of the GUI objects, said first characteristic being common to each of the GUI objects in a same one of the plurality of groups, and, for each GUI object in the same one of the groups a second characteristic that is different for each of the functions in the second group to distinguish the function associated with said one of the GUI objects from functions associated with other GUI objects in the same one of the groups, and each of the first and second characteristics of each GUI object being distinguishable by a user upon presentation of each GUI object; Presenting ones of the GUI objects to a user as an interface enabling control of the software application; and wherein the first and second characteristics are non-spatial characteristics, functions in the first group have a first operationally related purpose and functions in the second group have a second operationally related Purpose different from said first related purpose.

9. The method of claim 8 wherein at least two functions have a same first operational characteristic and are associated with GUI objects having a same first visual characteristic and other functions not having the first operational characteristic are associated with GUI objects not having said same first visual characteristic.

10. A computer program residing on a computer-readable medium, comprising instruction for causing a computer to:

operationally associating a different graphical user interface (GUI) object with each of a plurality of functions of a software application, the plurality of functions being subdivided into a plurality of groups including a first group and a second group, each comprising at least two of the functions, and each one of the GUI objects comprising a first characteristic associating said one of the GUI objects with a one of the plurality of groups comprising the function associated with said one of the GUI objects, said first characteristic being common to each of the GUI objects in a same one of the plurality of groups, and, for each GUI object in the same one of the groups, and a second characteristic that is different for each of the functions in the second group to distinguish the function associated with said one of the GUI objects from functions associated with other GUI objects in the same one of the groups, and each of the first and second characteristics of each GUI object being distinguishable by a user upon presentation of each GUI object; and presenting ones of the GUI objects to a user as an interface enabling control of the software application; and wherein the first and second characteristics are non-spatial characteristics, functions in the first group have a first operationally related, purpose, and functions in the second group have a second operationally related purpose different from said first related purpose.

11. The computer program of claim 10 wherein the first characteristic is a background image and the second characteristic is a foreground image.

12. The computer program of claim 11 wherein each GUI object is an icon.

13. The computer program of claim 10 further comprising instructions for causing the computer to receive a user selection identifying a GUI object and execute the function associated with the selected GUI object.

14. A computer system having a processor operatively interconnected to a memory, a graphical display device, and a user input device, a graphical user interface comprising:

a plurality of different graphical user interface (GUI) objects that can be rendered to the graphical display device, each GUI object being user-selectable to access one of a plurality of functions of a computer program, the plurality of functions being subdivided into a plurality of groups including a first group and a second group, each comprising at least two of the functions and each one of the GUI objects comprising a first characteristic associating said one of the GUI objects with one of the plurality of groups comprising the function associated with said one of the GUI objects, said first characteristic being common to each of the GUI objects in a same one of the plurality of groups, and a second characteristic that is different for each of the functions in the second group to distinguish the function associated with other GUI object from functions associated with other GUI objects in the same one of the groups, and each of first and second characteristics of each GUI object being distinguishable by a user upon presentation of each GUI object; and presenting ones of the GUI objects to a user as an interface enabling control of the computer program; and wherein the first and second characteristics are non-spatial characteristics, functions in the first group have a first operationally related purpose, and functions in the second group have a second operationally related purpose different from said first related purpose.

15. The system of claim 14 wherein the first characteristic is a background image and the second characteristic is a foreground image.

16. The system of claim 14 wherein functions having a same first operational characteristic are associated with GUI objects having a same first visual characteristic and functions having a different first operational characteristic are associated with GUI objects having a different first visual characteristic.

17. The system of claim 14 wherein functions having a same second operational characteristic are associated with GUI objects having a same second visual characteristic and functions having a different second operational characteristic are associated with GUI objects having a different second visual characteristic.

18. A software control method comprising:

forming a plurality of groups including a first group and second a group each comprising a plurality of functions of a software application; associating a first visual characteristic with each of the groups, said first visual characteristic being different for each group and said first visual characteristic signifying a functional attribute common to the plurality of software functions in the group; for each of the groups, associating a second visual characteristic with each of the plurality of functions in said group, the second visual characteristic being different for each function within the group and said second visual characteristic distinguishing each function in the group; and operationally associating a different graphical user interface (GUI) object with each function in each of the groups, each GUI object comprising the first visual characteristic associated said function with the group comprising said function and the second visual characteristic distinguishing said function within the group comprising said function; and wherein the first and second characteristics are non-spatial characteristics, functions in the first group have a first operationally related purpose, and functions in the second group have a second operationally related purpose different from said first related purpose.

* * * * *

UNITED STATES PATENT AND TRADEMARK OFFICE
CERTIFICATE OF CORRECTION

PATENT NO.    : 6,459,441 B1
DATED         : October 1, 2002
INVENTOR(S)   : Perroux et al.

It is certified that error appears in the above-identified patent and that said Letters Patent is hereby corrected as shown below:

<u>Column 8,</u>
Line 6, "instruction" should read -- instructions --.
Line 61, after the word "with", delete "other" and insert -- said one of the --.
Line 61, "object" should read -- objects --.

Signed and Sealed this

Fourth Day of February, 2003

JAMES E. ROGAN
*Director of the United States Patent and Trademark Office*